United States Patent [19]

Newstead

[11] 3,951,239
[45] Apr. 20, 1976

[54] PLURAL DISC BRAKE SYSTEMS

[75] Inventor: Charles Newstead, Walsall, England

[73] Assignee: Girling Limited, Birmingham, England

[22] Filed: May 30, 1974

[21] Appl. No.: 474,775

[30] Foreign Application Priority Data
June 5, 1973 United Kingdom............... 26702/73

[52] U.S. Cl. ............................. 188/71.5; 188/72.4; 188/106 P; 192/87.11
[51] Int. Cl.[2] ..................................... F16D 55/36
[58] Field of Search................. 188/71.1, 71.5, 72.4, 188/72.6, 106 P, 345, 73.3; 192/87.11, 87.15

[56] References Cited
UNITED STATES PATENTS

| 2,671,532 | 3/1954 | DuBois | 188/71.5 X |
| 2,720,286 | 10/1955 | Bricker | 188/72.4 |
| 2,757,557 | 8/1956 | Hoffman | 192/87.15 X |
| 3,037,602 | 6/1962 | Clements | 192/87.15 |
| 3,448,831 | 6/1969 | Newstead | 188/71.5 X |
| 3,734,248 | 5/1973 | Fay | 188/345 |

FOREIGN PATENTS OR APPLICATIONS

| 2,141,857 | 3/1972 | Germany | 188/72.5 |

Primary Examiner—George E. A. Halvosa
Attorney, Agent, or Firm—Scrivener Parker Scrivener and Clarke

[57] ABSTRACT

In a disc brake assembly of the type including first and second fluid pressure-operated actuators for applying friction pads to opposite faces of first and second axially spaced rotatable discs respectively, the first and second actuators are both disposed on the same one side of a disc diameter, and the actuators are both located adjacent to the outer face of an outer disc.

3 Claims, 6 Drawing Figures

PLURAL DISC BRAKE SYSTEMS

SPECIFIC DESCRIPTION

This invention relates to disc brake assemblies of the kind including first and second fluid pressure operated actuators for applying friction pads to the opposite faces of first and second axially spaced rotatable discs respectively.

In our U.S. patent application Ser. No. 170,254, filed Aug. 9, 1971, now abandoned, we described a disc brake assembly of the kind set forth in which the first and second actuators were mounted on the same side of one disc and at diametrically opposed positions.

According to our present invention in a disc brake assembly of the kind set forth the first and second actuators are both disposed on the same one side of a disc diameter, and the actuators are both located adjacent to the outer face of an outer disc.

Preferably, the disc brake assembly comprises a pair of first actuators and a pair of second actuators, the axes of all four actuators being substantially parallel in a common chordal plane of the disc. The first actuators may be located between the second actuators.

Conveniently the disc brake assembly comprises a stationary member which straddles the first and second disc and in which the friction pads are guided, and first and second pairs of axially movable pressure plates for urging the friction pads into engagement with the disc, the first and second actuators acting between the first and second pairs of pressure plates respectively.

The first and second actuators may be applied for independent operation so that the brake assembly is especially suitable for use in a dual braking system.

As in U.S. patent application Ser. No. 170,254 when the disc brake assembly is mounted in a vehicle the actuators are arranged in the inboard side of the disc which is innermost so that they are in a cooling air system. An added advantage of the present invention is that a greater area of the discs is uncovered which aids cooling of the discs.

One example of a disc brake assembly according to the invention is illustrated in the accompanying drawings in which.

Figure 1:
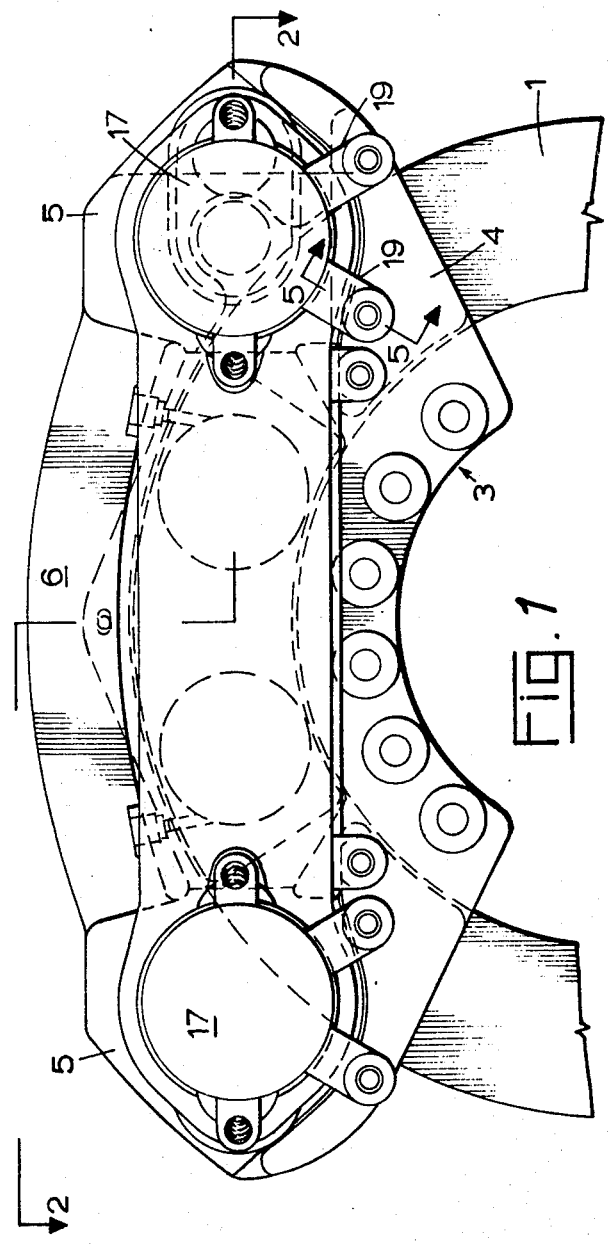
FIG. 1 is an end view of the assembly.
Figure 2:
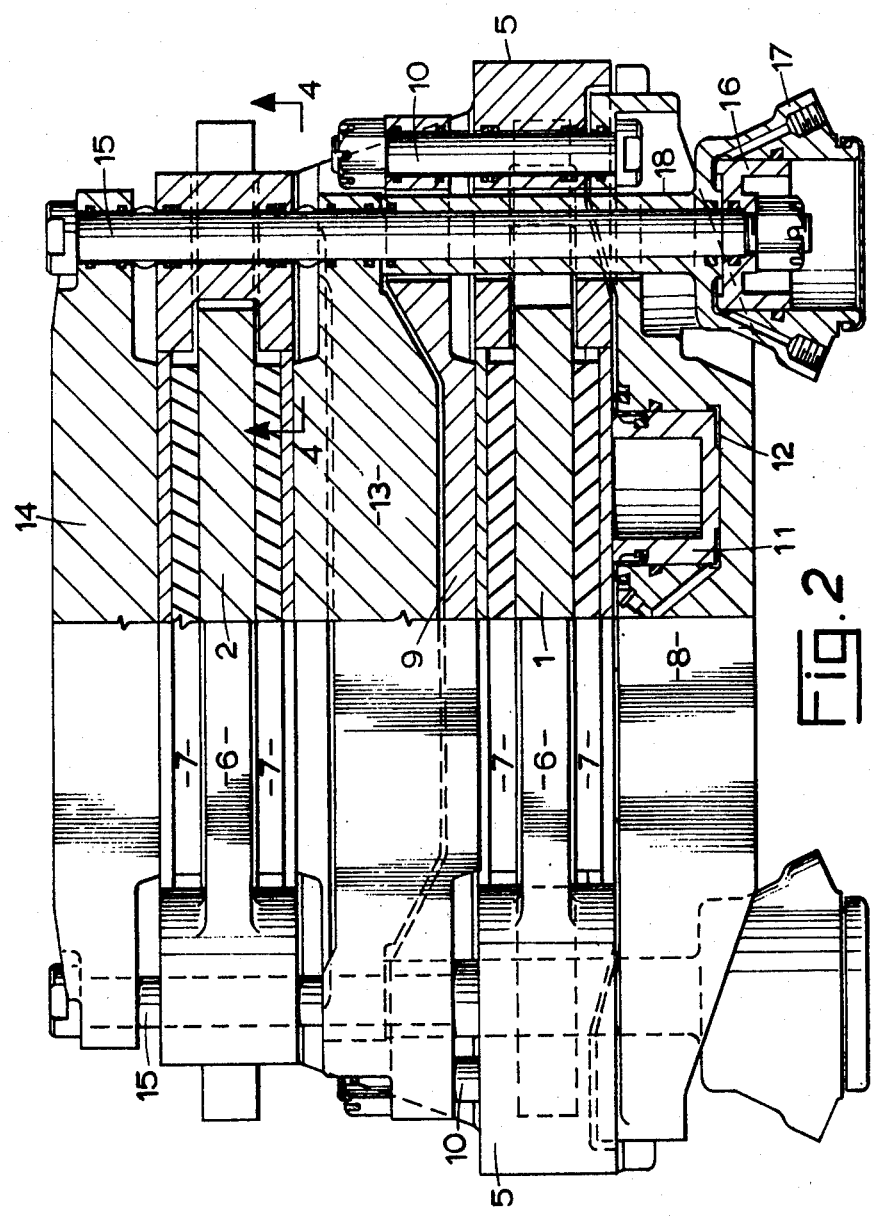
FIG. 2 is a section on the lines 2—2 of FIG. 1 with new friction pads.
Figure 3:
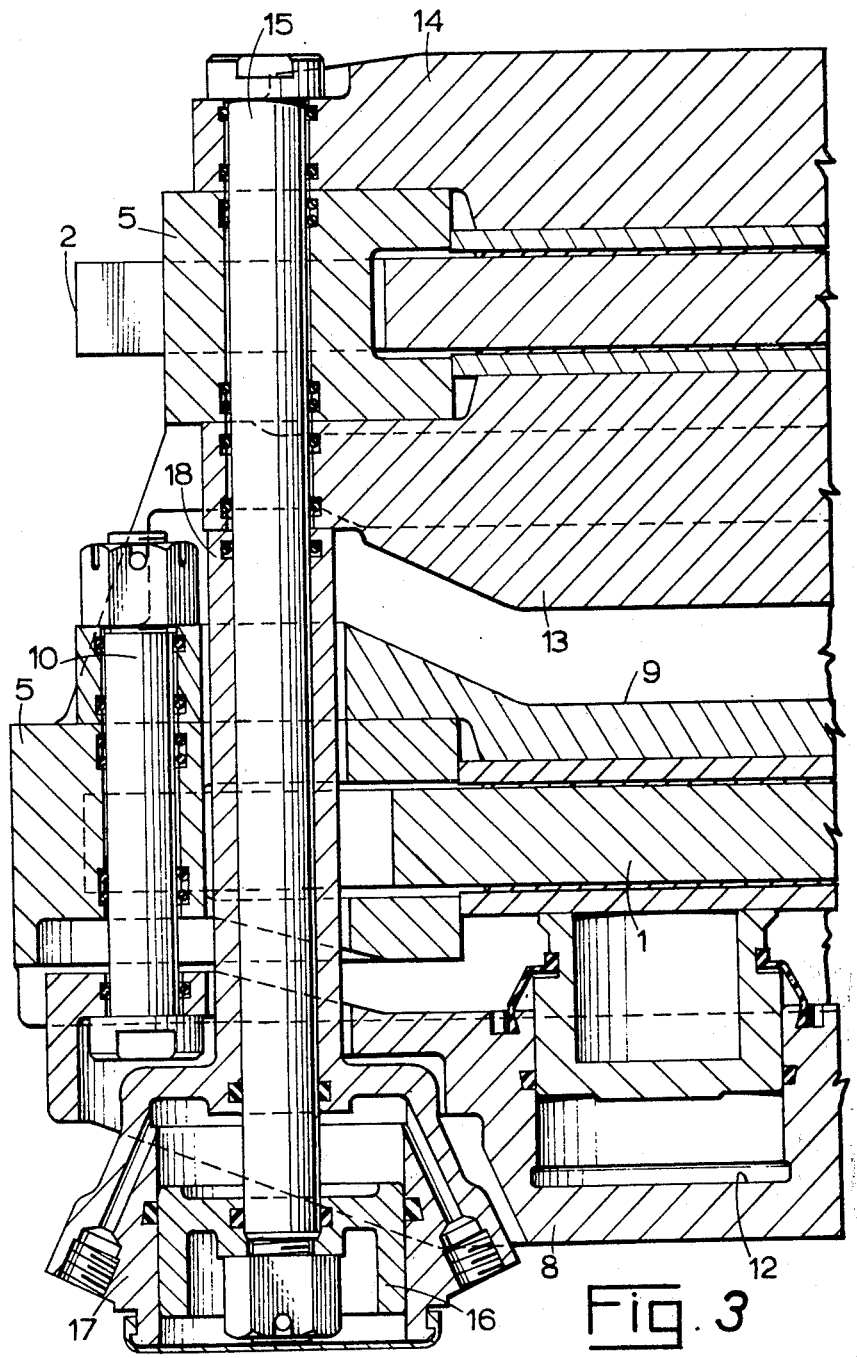
FIG. 3 is a half section corresponding to FIG. 2 showing worn friction pads.
Figure 4:
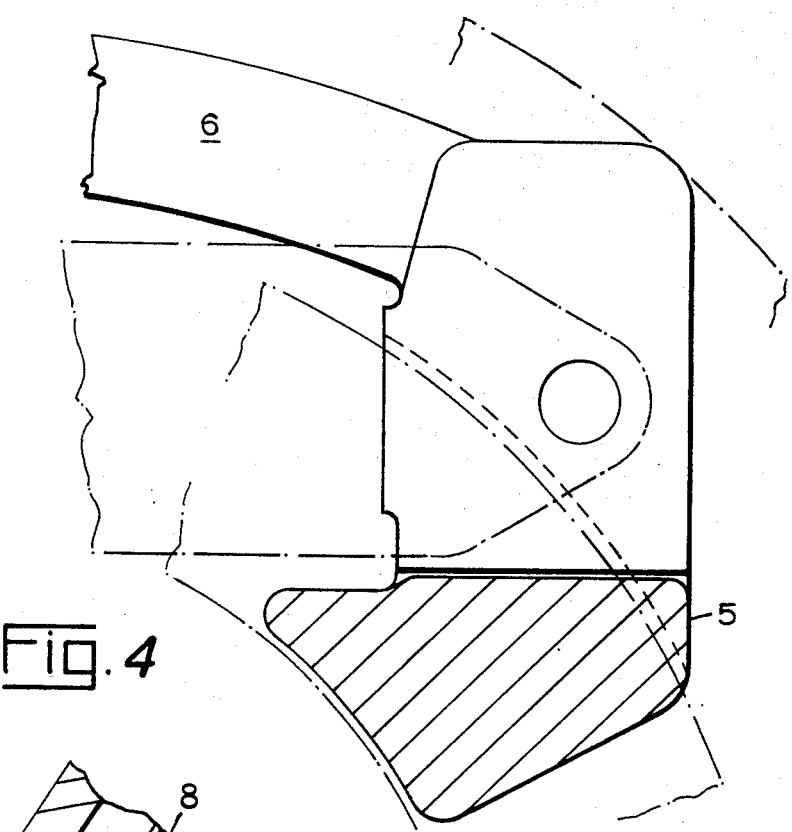
FIG. 4 is a section on the lines 4—4 of FIG. 2.

As shown in the drawings the disc brake assembly is mounted to co-operate with first and second axially spaced fixed discs 1 and 2 rotatable with an axle of a vehicle, the disc 1 being inboard of the disc 2.

The brake includes a stationary member 3 comprising a radial portion 4 adapted to be secured to a stationary part of the vehicle, two axially extending circumferentially spaced integral arms 5 straddling the disc, and two circumferential portions 6 extending over each disc and interconnecting arms. Friction pads 7 for engagement with opposite faces of each disc are carried by rigid backing plates guided in the stationary member between the arms 5 which take the drag on the friction pads in the application of the brakes.

A first pair of pressure plates 8 and 9 are arranged to apply the pads 7 to the inboard and outboard faces respectively of disc 1, the plates being clamped by two circumferentially spaced drawbars 10 floatingly supported in bores extending acially through the arms 5. Two pistons 11 working in blind-ended cylinder bores 12 arranged side-by-side in the pressure plate 8 form first actuators in a brake for the disc 1. The pistons 11 act directly on the backing plate of the adjacent friction pad 7 to apply that pad to the disc directly and the reaction on the cylinders is transmitted through the pressure plate 8 and the draw bars 10 to the pressure plates 9 which acts on the other friction pad 7 to apply it indirectly to the opposite face of the disc 1.

A second pair of pressure plates 13 and 14 are arranged to apply the pads 7 to the inboard and outboard faces respectively of disc 2, the plates 13 and 14 being clamped by two further circumferentially spaced drawbars 15 floatingly supported in two further bores extending axially through the arms 5. The drawbars 15 are each located adjacent to the inner side of a draw bar 10. Each drawbar 15 extends to the inboard side of the brake assembly where it is detachably connected to a piston 16 working in a cylindrical housing 17. The housing 17 has an axially extending tubular portion 18 sealingly engaging the drawbar 15 and abutting at its free end against the pressure plate 13. The piston 16, housing 17, and draw bar 15 form detachable second actuators of the assembly. The pistons 16 act directly on the drawbar 15 to apply pressure plate 14, and the reaction on the housings 17 is applied to the pressure plate 13 through the abutment with the tubular portion 18.

Figure 5:
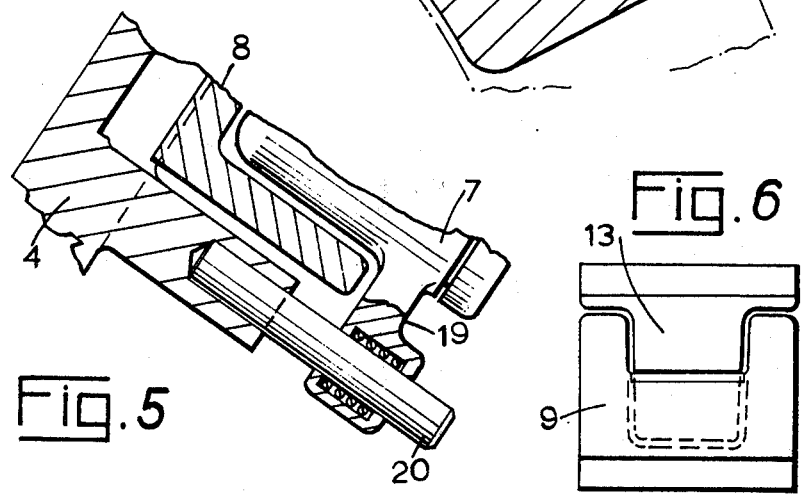
FIG. 5 is a section on the lines 5—5 of FIG. 1.

FIGS. 1 and 5 show that each housing 17 is provided with two angularly spaced lugs 19 which are guided on pins 20 projecting from the stationary member 3. The pins 20 prevent the housings from rotating and also carry the cantilevered weight of the assembly.

Figure 6:
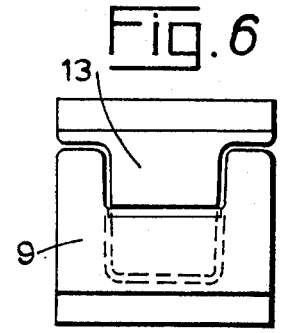
FIG. 6 is a part side view in the direction of arrow 6 in FIG. 1.

FIG. 6 shows that the pressure plates 9 and 13 are interdigitated to provide each of them with the requisite strength in the small axial space available.

Further details of the construction of the assembly are given in our U.S. patent application Ser No. 170,254, especially in relation to the second actuators where the pistons 16 are detachable from the draw bars 15.

The pistons 11 and the cylinders 12 comprising the first actuators, and the pistons 16 and the cylinders 17 comprising the second actuators may be actuated independently. This enables the brake to be used in a dual braking system.

In the disc brake assembly described above since the drag on the friction pads in the application of the brake is taken directly, the draw-bars are not subjected to any substantial "non-axial" loading. This has the advantage that each pair of draw-bars have only to be supported in a manner necessary to carry the weight of the pressure plates with which they co-operate.

I claim:

1. A disc brake assembly for a vehicle including first and second axially spaced rotatable discs, each disc having an inner face and an outer face, said inner face of said first disc facing said inner face of said second disc and said outer face of each disc facing outwardly away from the other disc, a first pair of friction pads for engagement with said inner and said outer faces of said first disc, a second pair of friction pads for engagement with said inner and said outer faces of said second disc, first and second fluid-pressure operated actuators for applying said first and second pairs of friction pads to said inner and outer faces of each respective said first and second disc, said first and second actuators being both located adjacent to said outer face of said first disc, a first pair of inner and outer axially movable pressure plates for urging said first pair of friction pads into engagement with said inner and outer faces of said first disc, a second pair of inner and outer axially movable pressure plates for urging said second pair of friction pads into engagement with said inner and outer faces of said second disc, wherein said first actuator comprises at least one hydraulic piston working in a blind bore in said outer pressure plate of said first pair of pressure plates and acting directly on the adjacent friction pad of said first pair to apply it to said outer face of said first disc, and a pair of circumferentially spaced draw-bars couple said last mentioned outer pressure plate to said inner pressure plate of said first pair so that the hydraulic reaction is transmitted to the friction pad for engagement with said inner face of said first disc, and wherein said second actuator comprises a pair of circumferentially spaced hydraulic cylinders, a piston working in each hydraulic cylinder, a tubular portion carried by each cylinder and acting on said inner pressure plate of said second pair to apply an adjacent friction pad to said inner face of said second disc, and a draw-bar guided through each tubular portion and through which said last mentioned piston acts on said outer pressure plate of said second pair to apply the other friction pad of said second pair to said outer face of said second disc, all said pressure plates lying on a common chord, and said inner plates of both pairs being interdigitated.

2. A disc brake assembly as claimed in claim 1, wherein said cylinders of said second actuators are both located between said draw-bars which couple said pressure plates of the said first pair.

3. A disc brake assembly as claimed in claim 1, wherein a stationary member straddles said disc and the draw-bars are floatingly guided through clearance bores in the stationary member, drag on the friction pads being taken directly by the stationary member in which the pads are guided for axial movement with respect to their respective disc.

* * * * *